US009524474B2

(12) United States Patent
Budiscak et al.

(10) Patent No.: US 9,524,474 B2
(45) Date of Patent: Dec. 20, 2016

(54) METHOD FOR CARRYING OUT AT LEAST ONE LEARNING FUNCTION IN A MOTOR VEHICLE AND MEANS FOR THE IMPLEMENTATION THEREOF

(71) Applicant: Robert Bosch GmbH, Stuttgart (DE)

(72) Inventors: Benoit Budiscak, Hohenhaslach (DE); Ronald Remy, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 310 days.

(21) Appl. No.: 14/248,573

(22) Filed: Apr. 9, 2014

(65) Prior Publication Data

US 2014/0310206 A1 Oct. 16, 2014

(30) Foreign Application Priority Data

Apr. 15, 2013 (DE) .................. 10 2013 206 641

(51) Int. Cl.
*G06F 17/00* (2006.01)
*G06N 99/00* (2010.01)
*F02D 41/24* (2006.01)
*F02D 41/22* (2006.01)
*B60W 50/00* (2006.01)

(52) U.S. Cl.
CPC ......... *G06N 99/005* (2013.01); *F02D 41/2438* (2013.01); *F02D 41/2441* (2013.01); *B60W 2050/0014* (2013.01); *B60W 2050/0088* (2013.01); *F02D 2041/228* (2013.01); *F02D 2200/701* (2013.01)

(58) Field of Classification Search
None
See application file for complete search history.

(56) References Cited

U.S. PATENT DOCUMENTS

| 6,016,883 A * | 1/2000 | Yamada | B60K 23/08 180/233 |
| 2004/0229728 A1* | 11/2004 | Oshima | F16H 61/143 477/176 |
| 2012/0303251 A1* | 11/2012 | Shimizu | F02D 13/0238 701/113 |
| 2013/0268184 A1* | 10/2013 | Zagorski | G08G 1/166 701/300 |
| 2014/0129104 A1* | 5/2014 | Park | F16D 48/06 701/68 |

FOREIGN PATENT DOCUMENTS

| DE | 101 59 016 | 6/2003 |
| DE | 10 2006 047 240 | 4/2008 |
| EP | 1 807 267 | 7/2007 |
| WO | WO 2006/045667 | 5/2006 |

* cited by examiner

*Primary Examiner* — Li-Wu Chang
(74) *Attorney, Agent, or Firm* — Norton Rose Fulbright US LLP; Gerard Messina

(57) ABSTRACT

A method for carrying out a learning function is described, which is used to provide at least one correction value to compensate for at least one nominal value deviation of at least one component of a motor vehicle. At least one characteristic is ascertained in the case of at least one defined operating state of the motor vehicle with the aid of the learning function and used to determine the at least one correction value. The method includes prompting a driver of the motor vehicle to operate the motor vehicle in the at least one defined operating state. A system for implementing a corresponding method is also described.

18 Claims, 2 Drawing Sheets

METHOD FOR CARRYING OUT AT LEAST ONE LEARNING FUNCTION IN A MOTOR VEHICLE AND MEANS FOR THE IMPLEMENTATION THEREOF

RELATED APPLICATION INFORMATION

The present application claims priority to and the benefit of German patent application no. 10 2013 206 641.4, which was filed in Germany on Apr. 15, 2013, the disclosure of which is incorporated herein by reference.

FIELD OF THE INVENTION

The present invention relates to a method for carrying out at least one learning function in a motor vehicle and a system or arrangement which are provided for implementing such a method.

BACKGROUND INFORMATION

During the manufacturing of motor vehicles, certain tolerances of the components used, in particular the components of internal combustion engines or the internal combustion engines themselves, are unavoidable. Such tolerances may be, for example, differences in the compression values of the cylinders of an internal combustion engine and differences in the compression mean values between multiple internal combustion engines of the same type or series. Corresponding tolerances also occur in the installed injectors and in all exhaust-relevant components of internal combustion engines (turbocharger, air mass sensor, exhaust gas recirculation valve, etc.).

Those skilled in the art frequently refer in this context to so-called min and max components. A max injector will inject more fuel during the same activation duration than a nominal injector. A nominal injector is an injector here which corresponds to its particular specification without any deviation (i.e., has a tolerance of zero). One also refers in this case to a "golden injector" or a corresponding "golden" component. During the development of motor vehicles, a "golden system" is used in the so-called application phase. This applies in particular for the application phase of the exhaust gas optimization. A "golden system" or a "golden engine" only has nominal components.

In order to compensate for nominal value deviations in the actually constructed motor vehicles, an array of learning functions is known, to each of which specific input variables are applied. Learning functions which may be used within the scope of the present invention are, for example, provided in the case of IQA (injector quantity adjustment; compensation of the manufacturing tolerance during the injector manufacture), MCC (model-based charge control; model-supported charge regulation), PWC (pressure wave compensation; compensation of hydraulic oscillations), MBC (model-based boost pressure control; model-supported boost pressure regulation), ZFC (zero fuel calibration; correction of the pilot injection, zero-fuel quantity calibration), FBC (fuel balance control; balancing of the cylinder scattering of the injection quantity), FMA (fuel mean value adaptation; lambda-based air mass and air quantity correction), and FMO (fuel mass observer; lambda-based correction of the quantity at full load), which predominantly relate to diesel engines. Learning functions exist in the case of gasoline engines for the mixture adaptation or the torque loss adaptation, for example.

Learning functions correct engine activation parameters with the aid of corresponding correction values, for example, so that the internal combustion engine behaves like a "golden engine" after application of the correction values. Ideally, after a corresponding correction, an internal combustion engine having exclusively min or max components also has an identical power and identical exhaust gas results as an engine having nominal components. Corresponding learning functions also correct deviations or drifts which may occur during the service life of the motor vehicle. The nominal value deviations are therefore also referred to here as "manufacturing-related" and as "age-related" nominal value deviations. For example, if an injector drifts in the course of operation of a vehicle within a certain scope away from the originally provided value, this is corrected by the learning functions.

The explained learning functions have the disadvantage that they require several thousand kilometers (typically approximately 5000 km), until they may effectively act or may be activated. This is to be attributed to the fact that the learning functions must each ascertain corresponding characteristics for a variety of operating states of the motor vehicle, which are each defined differently, and are only then capable of providing the correction values. Furthermore, corresponding learning functions must be continuously recalibrated over the entire service life of the motor vehicle, which also includes the ascertainment of corresponding characteristics in multiple defined operating states.

Therefore, the need still exists for improvements in the performance of corresponding learning functions, in particular for the reduction of the time which is required for corresponding learning functions.

SUMMARY OF THE INVENTION

Against this background, the present invention provides a method for carrying out at least one learning function in a motor vehicle and also arrangement for implementing such a method having the features of the independent patent claims.

Exemplary embodiments are the subject matter of the dependent patent claims and the following description.

The present invention is directed to a method for carrying out a corresponding learning function, which is used to provide a correction value to compensate for at least one nominal value deviation of at least one component of a motor vehicle. In this case, with the aid of the learning function, characteristics are ascertained in at least one defined operating state of the motor vehicle and used to determine the correction values.

In conventional motor vehicles, corresponding learning functions run in the background. The driver is not aware that a learning function is carried out. A connection between the learning functions and the traveled driving route also does not conventionally exist.

It is provided according to the present invention, to accelerate and simplify carrying out a corresponding learning function, that a driver of the motor vehicle is prompted, in particular during at least one learning operation period of time, to operate the motor vehicle in the at least one defined operating state and advantageously to incorporate a driving route which has been traveled and/or is to be traveled, during the carrying out of the learning function.

In particular, the time which corresponding learning functions require to be able to provide correction values to compensate for the nominal value deviations (i.e., to be "trained") is reduced by the measures according to the present invention. For example, the above-mentioned zero fuel calibration (ZFC), which will be explained hereafter, is "learned" in overrun phases at a specific speed and a specific rail pressure.

In the case of the zero fuel calibration, as is disclosed, for example, in DE 101 59 016 A1, for example, an activation duration for a first partial injection, for example, a pilot injection, is increased proceeding from a zero value, at which injection reliably does not occur, until the characteristic, for example, an ion current, which characterizes an ignition lag, is detected. The activation duration is then increased further until the characteristic which characterizes the ignition lag no longer substantially changes. The method is based on the fact that the ignition lag, i.e., the time interval between an activation of a valve and the beginning of combustion, initially decreases with increasing activation duration. From a specific activation duration, the ignition lag no longer changes. The activation duration at which the ignition lag transitions into the saturation is considered to be the optimal activation duration for a pilot injection and is used as a standard value for the activation. The ascertained value represents the learned value of the zero fuel calibration function and is used to provide corresponding correction values.

An "overrun phase" refers to a phase, during which, in the case of a gasoline engine, the throttle valve is closed, the gas pedal is not actuated, and the engine is not at idle speed. In general, the term "overrun phase" may also refer to a phase, during which an internal combustion engine is not fired and the clutch is engaged. The internal combustion engine is thus entrained via the wheels during overrun phases. For example, during the zero fuel calibration, each cylinder must be trained individually in corresponding overrun phases. In the case of a twelve-cylinder engine having automatic transmission, in which overrun phases occur relatively rarely, a relatively long time is necessary for training all cylinders. The motor vehicle is thus in a state which is not optimal with respect to its performance capability and its emission values for a long time. The optimal state is only provided when all learning functions are trained and the motor vehicle corresponds to a nominal ("golden") system.

The present invention overcomes these restrictions in that the driver is incorporated in corresponding learning functions and is prompted to operate the motor vehicle in the at least one defined operating state.

A corresponding motor vehicle may therefore be put more rapidly into an optimal state, in which the exhaust and consumption values are nearly optimal. Since the training time of a corresponding learning function is shortened, the vehicle will potentially emit less pollutants and carbon dioxide.

Furthermore, the present invention allows the emission limits to be maintained during production and field tests, as are prescribed, for example, in the regulations about the documentation of the so-called COP (conformity of production) and "in-use compliance" (CAP 2000 or Euro 3/Euro 4). These are to ensure that motor vehicles maintain the emission regulations in the field over a specific time or route. In the case of Euro 4, for example, these are five years or 100,000 km.

The learning state of the learning functions is advantageously registered by the engine control unit, for example, which already has all required items of information. The "learning state" specifies, for example, which fraction of the provided learning functions is already trained or which areas or fractions of the learning functions are not yet trained. For example, the learning state—optionally in prepared form— may subsequently be transmitted to the driver. Simultaneously, instructions may be transmitted to the driver, which specify how the not yet trained learning functions (or corresponding fractions) may be trained. For example, it may be communicated to the driver which gear choice/speed combination has not yet been able to be taken into consideration within the scope of a corresponding learning function.

For example, a known user information system of a motor vehicle, as is implemented in the onboard computer, may be used to transmit corresponding items of information to a driver. The items of information may be transmitted, for example, by a visual display via digital instruments and/or optionally audio-visually via an entertainment system.

The scope and the richness of detail of the items of information to be transmitted to the driver may be made dependent on various factors. For example, the degree of abstraction of the items of information may be preselected within the scope of various professionalism levels. For example, it may be communicated to an experienced driver having wide-ranging knowledge about the engine control unit that an overrun phase is necessary, so that he knows independently which measures are to be taken for this purpose.

For example, simple scenarios may be displayed to a less experienced driver, which allow him to set specific operating states of the motor vehicle or to operate the vehicle in such operating states. The driver may be prompted in this way, for example, to initiate an overrun phase having a minimum engine speed and a defined gear. Furthermore, the driver may be admonished to drive in specific speed ranges, for example. In the case of a manual transmission, this may include shifting later or earlier than usual, for example, in the case of automatic or semiautomatic transmissions, the driver may be prompted to change into a corresponding manual operation. For example, the driver may also be requested to turn off the start-stop system when idle phases are necessary for the training. Alternatively thereto, this may also be performed independently by the vehicle, as is also the case in the event of a request of the battery management, for example, if the onboard electrical system voltage is excessively weak or there is a demand of an air-conditioning system. This may be communicated to the driver, so that he does not erroneously presume a malfunction of the vehicle.

A corresponding user information system may also include a so-called dashboard, for example, which gives the driver the instruction, for example: "If possible, start up overrun phases in the third gear more frequently. Please obey the traffic regulations and observe road safety." If the training of the function is successful, feedback may be given to the driver that the attempt was successful. The driver is hereby incorporated in the learning function.

If a so-called gear change display is provided, this may advantageously also be used. The gear change display indicates the optimal shift points on the speedometer or gives the driver the instruction in which gear he should drive. Via a corresponding gear change display, alternatively to the conventional predefined shift points, during a training phase of a learning function, the shift points which are optimal for training the learning function may be predefined. This permits different operating points than usual to be approached and thereby causes a more rapid training. In the case of an automatic transmission, the shift points may be changed by the engine control unit, so that the ranges required for the learning function may be approached in a targeted manner.

An incorporation of the traveled route or the route to be traveled may also be advantageous within the scope of the present invention. For this purpose, for example, a communication may occur between the engine control unit and a navigation system (for example, via a CAN bus). The navigation system provides items of information about the traveled route and about the upcoming driving demands (for example, downhill grade or uphill grade or traffic jams communicated via a traffic information system). An engine control unit may therefore reasonably prioritize and plan the training of specific functions depending on the driving route. If a downhill grade is coming up, many overrun phases are presumably possible. If an uphill grade is coming up, in contrast, the instruction to the driver to set an overrun phase is less reasonable. The method may thus include a determination of a corresponding probability.

If a driver specifies a specific destination in a navigation system, the engine control unit may estimate, as a function of the profile of the driving route and the traffic conditions, which learning functions and in what regard these learning functions may be trained. If many different overrun phases are to be expected at different speeds (city, highway, freeway), the system may first wait before it gives an instruction to the driver. In this case, the functions could possibly also be learned without incorporation of the driver, which will possibly be perceived to be annoying.

An incorporation of so-called onboard diagnostic functions is also possible in the sense of more rapid training of the learning functions. An array of such onboard diagnostic functions also requires a specific mode of driving and/or specific conditions (operating points, engine temperature) to be activated and to be able to carry out a diagnosis.

A computing unit according to the present invention, for example, a control unit of a motor vehicle, is configured as a system or arrangement for implementing the method according to the present invention, in particular by programming, for the purpose of carrying out a method according to the present invention.

The implementation of the method in the form of software is also advantageous, since this causes particularly low costs, in particular if an executing control unit is also used for further tasks and is therefore present in any case. Suitable data media for providing the computer program are in particular diskettes, hard drives, flash memories, EEPROMs, CD-ROMs, DVDs, etc. A download of a program via computer networks (Internet, intranet, etc.) is also possible.

Further advantages and embodiments of the present invention result from the description and the appended drawings.

It is understood that the above-mentioned features and the features still to be explained hereafter are usable not only in the particular specified combination, but rather also in other combinations or alone, without departing from the scope of the present invention.

The present invention is schematically shown on the basis of an exemplary embodiment in the drawing and will be described in greater detail hereafter with reference to the drawing.

DETAILED DESCRIPTION

Figure 1:
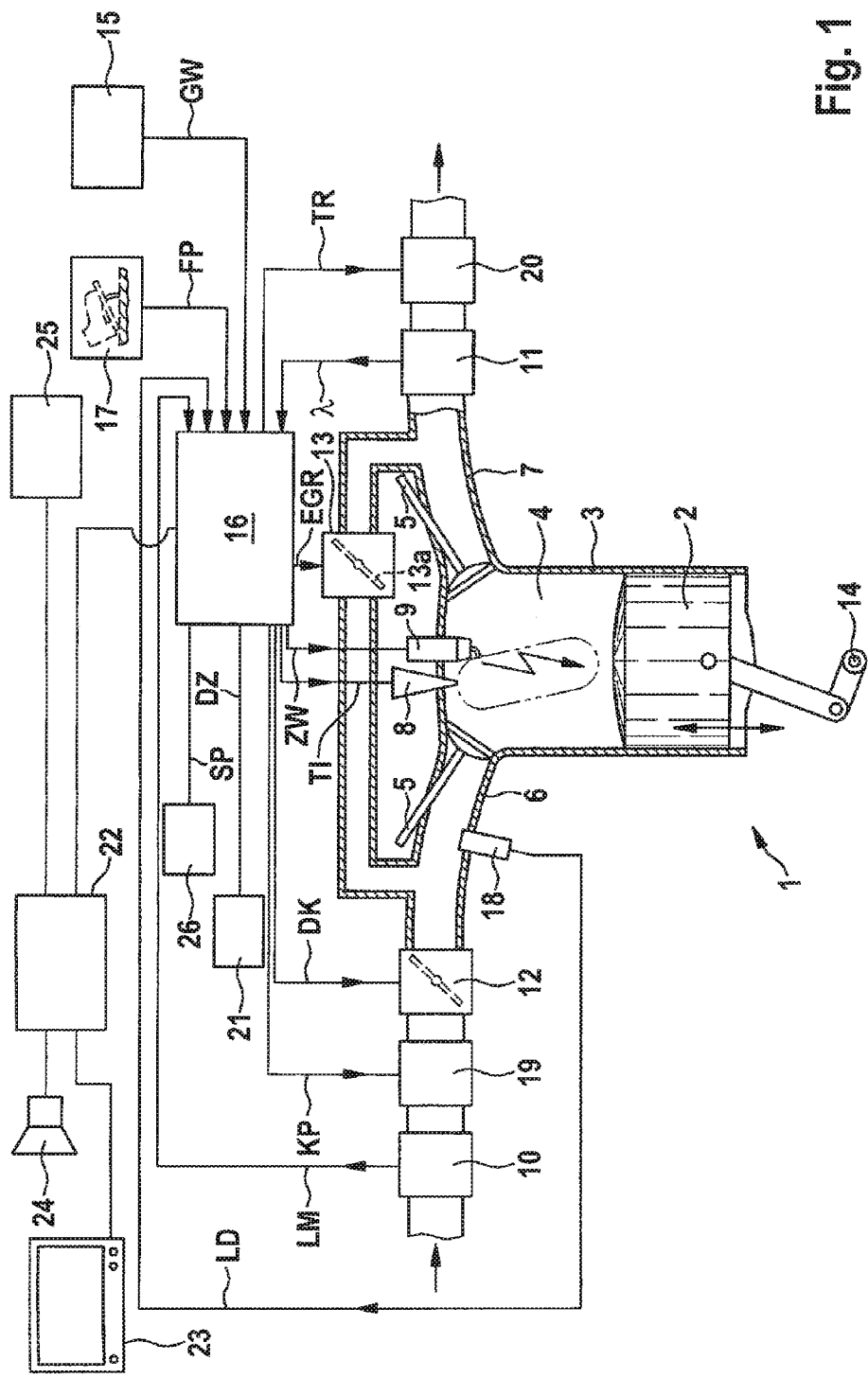
FIG. 1 shows components of a motor vehicle, which may be operated according to the present invention, in a schematic view.

In FIG. 1, components of a motor vehicle, which may be operated according to the present invention, are schematically shown and are identified as a whole with reference numeral 1. A piston 2 of an internal combustion engine (not shown in greater detail) is movable up and down in a cylinder 3. A crankshaft 14, via which ultimately at least one wheel of motor vehicle 1 is driven using a drive torque, is set into a rotational movement by the piston. The crankshaft is connected for this purpose to a drivetrain, which typically has a transmission, a clutch, brakes, and an electric machine, etc.

Cylinder 3 is provided with a combustion chamber 4, to which an intake manifold 6 and an exhaust pipe 7 are connected via valves 5. Intake manifold 6 is connected to exhaust pipe 7 via an exhaust gas recirculation valve 13 having a valve flap as an actuator for external exhaust gas recirculation. Exhaust gas recirculation valve 13 is controllable using a signal EGR from a control unit (ECU) 16. Furthermore, an injector 8, which is controllable using a signal TI, and a spark plug 9, which is controllable using a signal ZW, are connected to combustion chamber 4. The internal combustion engine of motor vehicle 1 according to FIG. 1 is based on the spark ignition principle. However, it is to be clarified that the present invention is not dependent on the ignition method of the internal combustion engine and is also well suitable for internal combustion engines using compression ignition. The present invention may also be used in internal combustion engines without exhaust gas recirculation.

A boost pressure sensor 18, which outputs a signal LD, which indicates the boost pressure in the intake manifold, and a throttle valve 12, the rotational position of which is settable with the aid of a signal DK, are housed in intake manifold 6. Intake manifold 6 is furthermore provided with an air flow sensor 10 and exhaust pipe 7 is provided with a lambda sensor 11. Air flow sensor 10 measures the air flow of the fresh air supplied to intake manifold 6 and generates a signal LM as a function thereof. Lambda sensor 11 measures the oxygen content of the exhaust gas in exhaust pipe 7 and generates a signal lambda ($\lambda$) as a function thereof. An exhaust system (not shown), including a catalytic converter, for example, a three-way catalytic converter, is connected downstream from lambda sensor 11.

In this example, in the case of internal combustion engines having turbocharging, compressor 19 of a turbocharger is situated between air flow sensor 10 and throttle valve 12. Compressor 19, in particular a regulating valve of compressor 19, is controllable with the aid of a signal KP. In the case of internal combustion engines having turbocharging, turbine 20 of the turbocharger is installed downstream from lambda sensor 11. Turbine 20, in particular a speed of turbine 20, is controllable with the aid of a signal TR.

Furthermore, control unit 16 is connected to a gas pedal sensor, which generates a signal FP, which specifies the position of a gas pedal 17, which is actuatable by a driver, and therefore the engine torque requested by the driver.

A speed sensor 21 is provided. It is configured to provide a signal DZ, which is also transmitted to control unit 16. This is correspondingly true for a velocity signal SP of a speedometer 26.

Furthermore, a shift unit 15 is provided. Shift unit 15 may be configured in this example as a shift unit 15 of a manual shift transmission (not shown) of the motor vehicle. A gear may be engaged with the aid of shift unit 15. Simultaneously, control unit 16 may be made aware of the gear selection via a corresponding signal GW.

Signal LD of boost pressure sensor 18, signal LM of the air flow sensor, signal lambda (λ) of lambda sensor 11, and signal DZ of speed sensor 21 are, for example, characteristics which result in the case of a defined operating state of the internal combustion engine, for example, a defined position of the regulating valve of compressor 19, which is controlled with the aid of signal KP, a defined speed of turbine 20, which is controlled with the aid of signal TR, and/or a defined injection quantity, which results from the control of injector 8 using signal TI. The precise values which these characteristics have is dependent on various manufacturing-related and/or age-related nominal value deviations. Such nominal value deviations are compensated for with the aid of correction values, which are ascertained with the aid of a learning method. Control unit 16 is also configured for this purpose.

A user information unit 22, with the aid of which a driver of motor vehicle 1 may be prompted to set at least one defined operating state of motor vehicle 1, is connected to control unit 16. For this purpose, the user may receive corresponding instructions with the aid of visual arrangement 23 or acoustic arrangement 24, for example, with the aid of a display screen of a navigation system, with the aid of a shift point display, and/or with the aid of a loudspeaker. For example, route and/or traffic data may be provided to user information unit 22 and/or control unit 16 via a navigation system 25.

Figure 2:
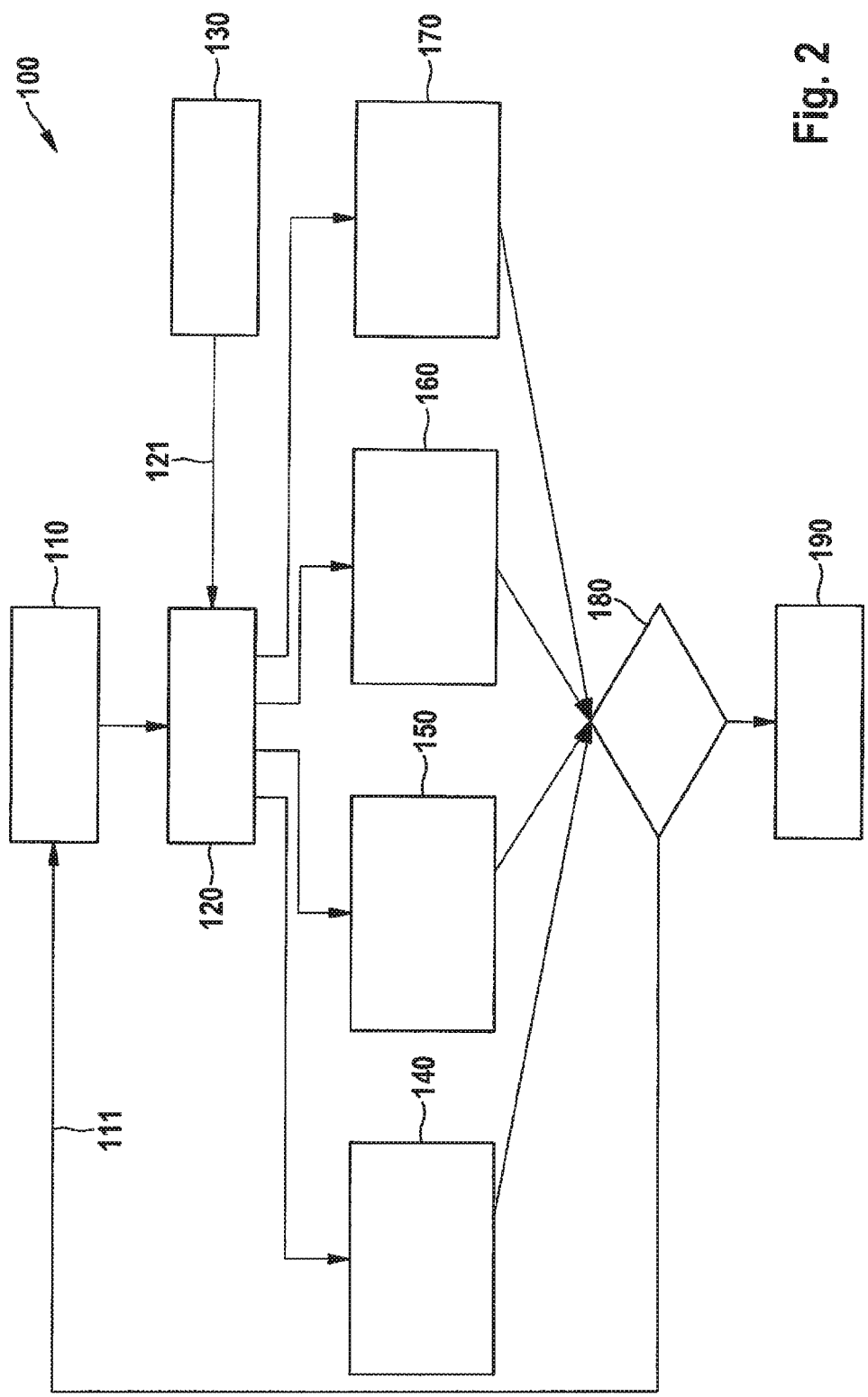
FIG. 2 shows a method according to one specific embodiment of the present invention in the form of a schematic flow chart.

In FIG. 2, a method according to one specific embodiment of the present invention is shown in the form of a flow chart and identified as a whole with reference numeral 100.

The method according to the present invention begins in a step 110, which may be carried out cyclically, for example, as illustrated with a sequence arrow 111. In step 110, the method or a corresponding control unit 16 transitions into a status in which a learning function is to be ascertained.

In a step 120, the above-explained prioritization and the selection of the particular approach for more rapid training of a corresponding learning function take place. For example, items of information 121, which are provided with the aid of a navigation system 130 with respect to a travel route and/or traffic conditions, for example, may be taken into consideration in this case.

Depending on the selection made in step 120, steps 140 through 170 and/or further steps (not shown) are carried out. For example, in a step 140, other shift points may be displayed with the aid of a shift point display or set in an automatic transmission. The driver may be informed about this. In a step 150, for example, a start-stop system may be turned off and the driver may optionally be informed of this. Alternatively, the driver may also be prompted to turn off the start-stop system. In a step 160, for example, the driver may be prompted to travel in a specific driving mode, i.e., using a specific gear and a specific velocity. If carrying out a learning function is not required or reasonable, the method may be continued in a step 170 with or without informing the driver.

In a step 180, it is checked whether or not a corresponding function was successfully trained. If not, the method progresses via sequence arrow 111 with step 110, i.e., a learning function is again carried out. If all learning functions have been successfully trained, the driver may optionally be informed of this in a step 190.

What is claimed is:

1. A method for performing a learning function, the method comprising:
ascertaining at least one characteristic of at least one defined operating state of the motor vehicle with the aid of the learning function, which is used to provide at least one correction value to compensate for at least one nominal value deviation of at least one component of a motor vehicle;
prompting a driver of the motor vehicle to operate the motor vehicle in the at least one defined operating state during at least one learning operation period of time; and
ascertaining a probability that the motor vehicle is operable in the at least one defined operating state in a following period of time, wherein the driver is only prompted to operate the motor vehicle in the at least one defined operating state when the probability exceeds a predefined value;
wherein at least one of route data and traffic data are ascertained to ascertain the probability.

2. The method of claim 1, wherein the driver is prompted to operate the motor vehicle in the least one defined operating state during the at least one learning operation period of time.

3. The method of claim 1, wherein the driver is prompted to operate the motor vehicle in the at least one defined operating state with the aid of a user information system.

4. The method of claim 3, wherein the driver is prompted to operate the motor vehicle in the at least one defined operating state with the aid of at least one of a visual arrangement and an acoustic arrangement.

5. The method of claim 1, wherein the at least one defined operating state includes at least one of a defined speed range, a defined velocity range, a defined gear selection, a defined throttle valve position, a defined activation state of at least one onboard electrical system consumer, an overrun phase, and at least one combination of the aforementioned operating features.

6. The method of claim 1, wherein the driver is made aware of a success in ascertaining the at least one characteristic for at least one of: (i) in the case of the at least one defined operating state with the aid of the learning function; and (ii) a success in determining the at least one correction value.

7. The method of claim 1, wherein the learning function is used to compensate for at least one nominal value deviation of at least one component of the internal combustion engine of the motor vehicle, at least one characteristic being ascertained in the case of at least one defined operating state of the internal combustion engine of the motor vehicle with the aid of the learning function and being used to determine the at least one correction value.

8. The method of claim 1, wherein the learning function is used to compensate for at least one of: (i) a nominal value deviation of an injection quantity; and (ii) at least one of a zero fuel quantity of at least one injector, at least one cylinder internal pressure, at least one boost pressure, at least one air flow, and at least one air quantity.

9. A motor vehicle, comprising:
a control unit including a processor arrangement configured to perform a learning function by performing the following:

a learning function, which is used to provide at least one correction value to compensate for at least one nominal value deviation of at least one component of the motor vehicle;

ascertaining at least one characteristic being of at least one defined operating state of the motor vehicle with the aid of the learning function and being usable to determine the at least one correction value;

prompting a driver of the motor vehicle to operate the motor vehicle in the at least one defined operating state during at least one learning operation period of time; and ascertaining a probability that the motor vehicle is operable in the at least one defined operating state in a following period of time, wherein the driver is only prompted to operate the motor vehicle in the at least one defined operating state when the probability exceeds a predefined value;

wherein at least one of route data and traffic data are ascertained to ascertain the probability.

10. A control unit of a motor vehicle, comprising:

a processor arrangement configured to perform a learning function by performing the following:

ascertaining at least one characteristic of at least one defined operating state of the motor vehicle with the aid of the learning function, which is used to provide at least one correction value to compensate for at least one nominal value deviation of at least one component of a motor vehicle; and prompting a driver of the motor vehicle to operate the motor vehicle in the at least one defined operating state during at least one learning operation period of time; and ascertaining a probability that the motor vehicle is operable in the at least one defined operating state in a following period of time, wherein the driver is only prompted to operate the motor vehicle in the at least one defined operating state when the probability exceeds a predefined value;

wherein at least one of route data and traffic data are ascertained to ascertain the probability.

11. A non-transitory computer readable medium having a computer program, which is executable by a processor, comprising:

a program code arrangement having program code for performing a learning function, by performing the following:

ascertaining, via the processor of a control unit of the motor vehicle, at least one characteristic of at least one defined operating state of the motor vehicle with the aid of the learning function, which is used to provide at least one correction value to compensate for at least one nominal value deviation of at least one component of a motor vehicle; and prompting, via the processor of a control unit of the motor vehicle, a driver of the motor vehicle to operate the motor vehicle in the at least one defined operating state during at least one learning operation period of time; and ascertaining a probability that the motor vehicle is operable in the at least one defined operating state in a following period of time, wherein the driver is only prompted to operate the motor vehicle in the at least one defined operating state when the probability exceeds a predefined value;

wherein at least one of route data and traffic data are ascertained to ascertain the probability.

12. The computer readable medium of claim 11, wherein the driver is prompted to operate the motor vehicle in the least one defined operating state during the at least one learning operation period of time.

13. The computer readable medium of claim 11, wherein the driver is prompted to operate the motor vehicle in the at least one defined operating state with the aid of a user information system.

14. The computer readable medium of claim 13, wherein the driver is prompted to operate the motor vehicle in the at least one defined operating state with the aid of at least one of a visual arrangement and an acoustic arrangement.

15. The computer readable medium of claim 11, wherein the at least one defined operating state includes at least one of a defined speed range, a defined velocity range, a defined gear selection, a defined throttle valve position, a defined activation state of at least one onboard electrical system consumer, an overrun phase, and at least one combination of the aforementioned operating features.

16. The computer readable medium of claim 11, wherein the driver is made aware of a success in ascertaining the at least one characteristic for at least one of: (i) in the case of the at least one defined operating state with the aid of the learning function; and (ii) a success in determining the at least one correction value.

17. The computer readable medium of claim 11, wherein the learning function is used to compensate for at least one nominal value deviation of at least one component of the internal combustion engine of the motor vehicle, at least one characteristic being ascertained in the case of at least one defined operating state of the internal combustion engine of the motor vehicle with the aid of the learning function and being used to determine the at least one correction value.

18. The computer readable medium of claim 11, wherein the learning function is used to compensate for at least one of: (i) a nominal value deviation of an injection quantity; and (ii) at least one of a zero fuel quantity of at least one injector, at least one cylinder internal pressure, at least one boost pressure, at least one air flow, and at least one air quantity.

* * * * *